United States Patent [19]
Katzer et al.

[11] Patent Number: 5,797,633
[45] Date of Patent: Aug. 25, 1998

[54] HOSE CONNECTOR, PARTICULARLY FOR THE CONNECTION OF HOSES, SUCH AS GARDEN HOSES

[75] Inventors: Johann Katzer, Neu-Ulm; Wolfgang Lindermeir, Untermarchtal; Franz Lopic, Nersingen, all of Germany

[73] Assignee: Gardena Kress + Kastner GmbH, Ulm, Germany

[21] Appl. No.: 594,589

[22] Filed: Jan. 31, 1996

[30] Foreign Application Priority Data

Feb. 4, 1995 [DE] Germany ............... 195 03 722.7

[51] Int. Cl.$^6$ ................................................. F16L 33/10
[52] U.S. Cl. .................. 285/243; 285/249; 285/322; 285/386
[58] Field of Search ............................ 285/242, 243, 285/249, 245, 246, 247, 248, 348, 322, 323, 324, 354, 386

[56] References Cited

U.S. PATENT DOCUMENTS

| 996,114 | 6/1911 | Müller . |
| 3,158,388 | 11/1964 | Marshall ............... 285/242 X |
| 3,521,822 | 7/1970 | Friedmann et al. . |
| 3,567,126 | 3/1971 | Martini . |
| 3,648,933 | 3/1972 | Grotz . |
| 3,854,664 | 12/1974 | Hunter . |
| 4,722,558 | 2/1988 | Badoureaux ............... 285/242 X |
| 4,754,925 | 7/1988 | Rubinstein . |
| 4,817,869 | 4/1989 | Rubinstein . |
| 5,072,072 | 12/1991 | Bawa et al. ............... 285/234 X |
| 5,372,307 | 12/1994 | Sesser . |

FOREIGN PATENT DOCUMENTS

| 503737 | 9/1992 | European Pat. Off. ......... 285/249 |
| 1243016 | 8/1960 | France ....................... 285/242 |
| 2 398 958 | 2/1979 | France . |
| 2492500 | 4/1982 | France ....................... 285/242 |
| 530 956 | 8/1931 | Germany . |
| 696 917 | 10/1940 | Germany . |
| 31 33 837 | 3/1983 | Germany . |
| 1 234 723 | 6/1971 | United Kingdom . |
| 2 166 669 | 3/1986 | United Kingdom . |

Primary Examiner—Randolph A. Reese
Assistant Examiner—Heather Shackelford
Attorney, Agent, or Firm—Quarles & Brady

[57] ABSTRACT

A hose connector with gripping elements (18) pressing a hose (14) on a socket (15) uses a two-part sleeve (24). The two-part sleeve includes a screw piece (25) and an extension sleeve connected to the screw piece by a rotary connection and the two-part sleeve surrounds and supports the hose for a significant portion beyond the clamping area of the gripping elements (18). This inner sleeve (32) also has the funnel-shaped, conical actuating surface (33) for the pressing of the gripping elements.

13 Claims, 1 Drawing Sheet

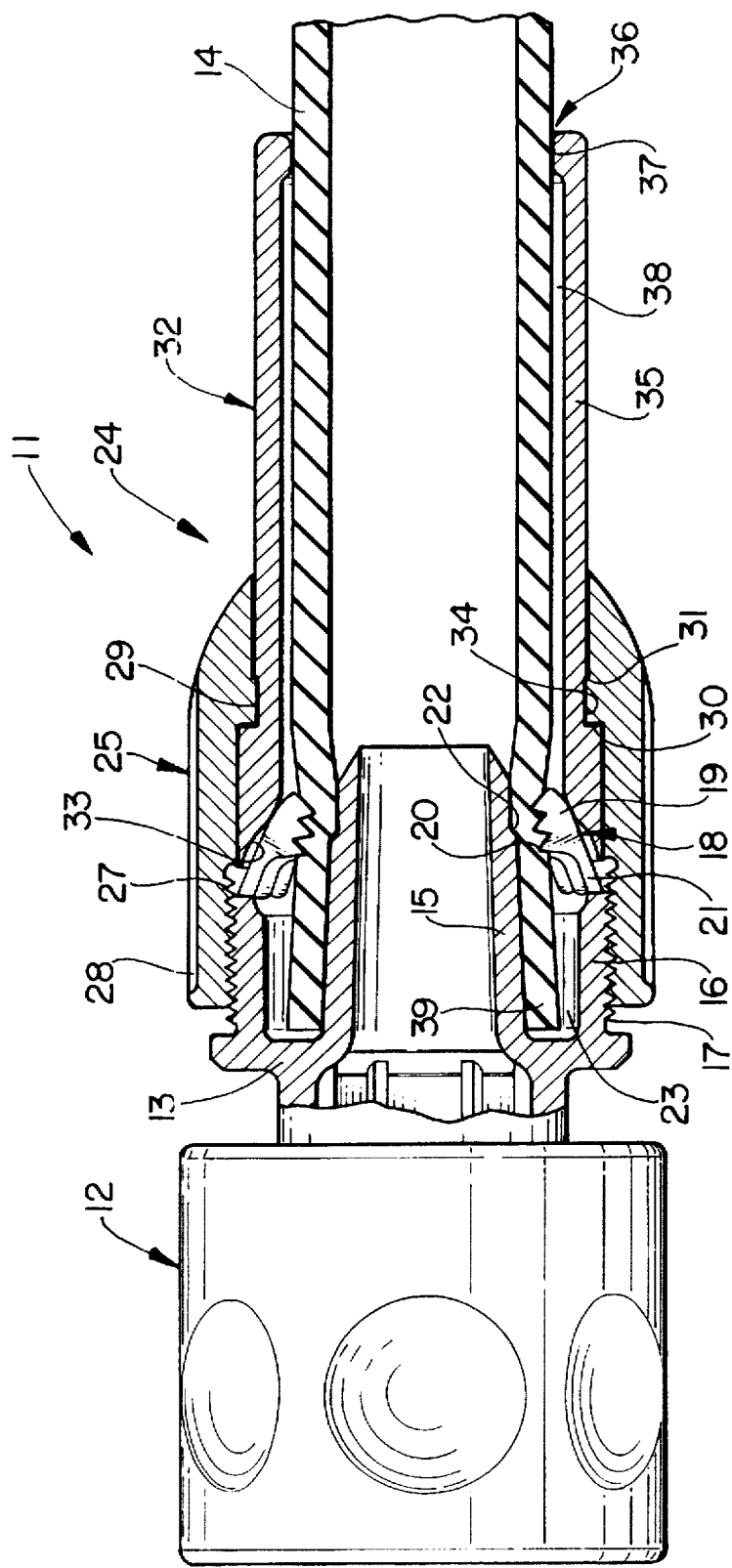

_5,797,633_

HOSE CONNECTOR, PARTICULARLY FOR THE CONNECTION OF HOSES, SUCH AS GARDEN HOSES

FIELD OF USE AND PRIOR ART

The invention relates to a hose connector, particularly for the connection of hoses, such as garden hoses, to hose couplings or the like, having a socket on which the hose is engaged, and gripping elements which press the hose from the outside under the action of a sleeve onto the socket, the sleeve having an extension surrounding the hose. Such a hose connector is known from U.S. patent application Ser. No. 996,114.

In the case of the latter hose connector, the socket, on which the hose is engaged and held close to its end by elastic gripping elements shaped onto the hose connection body, extends beyond the end of the hose extension. Thus, in the vicinity of this hose end, pressing again takes place on the conical socket at this point, so that a double clamping is obtained. However, this is only effective if the hose always has the same wall thickness. In the case of varying wall thicknesses, either only one or the other clamping is effective, because the screw sleeve simultaneously actuates the gripping elements and the extension with its inwardly directed bead. Thus, in all cases, one or the other clamping is not ideal, which can lead to unclear and unreliable connection conditions.

DE-U-94 03 412 describes a similar construction, in which the extension of the sleeve closely engages the hose circumference and optionally, also with an inner roughening of the sleeve, can form a tension relief and protection against kinking.

SUMMARY OF THE INVENTION

The problem of the invention is to provide a hose connector permitting a reliable fastening of hoses of different types and wall thicknesses.

Due to the fact that the sleeve projects over and beyond the socket, in the vicinity of the extension, the hose is not clamped and is instead only guided on its outer circumference, and is optionally prevented from expanding. This counteracts an expansion tendency of the hose, which can occur in the vicinity of the hose connector because, through the gripping elements which press on the hose wall, the hose is weakened at this point. In addition, under high internal pressures, the hose reinforcement, e.g. crosswise folded textile provings, can be pulled out somewhat from the end and consequently give rise to a bubble-like expansion at the hose outlet. This is prevented by the sleeve extension. It is simultaneously also possible to introduce into said extension different diameter hoses, particularly if the sleeve is constructed there with a small spacing from the hose. At the sleeve mouth, the extension can even have an inner bead substantially adapted to the normal hose diameter. Thus, it is always possible to introduce a thicker hose with a certain amount of pressure into the opening, because it can be compressed to a certain extent. However, over the remaining sleeve extension length it enters in a relatively friction-free manner.

The sleeve extension can project beyond the socket by at least the hose diameter. This area does not extend the hose connection in a disturbing manner and simultaneously ensures that undesired expansion phenomena do not occur.

The sleeve can be constructed in multipart, and in particular two-part manner, and preferably comprises a screw piece with a thread and a sleeve piece. The sleeve piece can be connected in rotary, but axially force-transferring manner to the hose piece and preferably an optionally conical actuating surface for the gripping elements is constructed on the sleeve piece. The screw and sleeve pieces can be connected so as to rotate relative to one another. Thus, if on tightening the hose connector, the screw piece is screwed onto a thread on the hose connection body, the actuating surface moves axially for the radial movement of the gripping elements, but does not have to rotate with the screw sleeve, so that no force is circumferentially exerted on the gripping elements. This permits a firm tightening of the hose connection without any elastic recovery tendency of the gripping elements.

In the vicinity of this rotary connection, a considerable axial force is transferred between the screw piece and the sleeve piece. For this purpose, in the force transfer direction (screwing on direction of the screw piece) the sleeve piece and the screw piece have in each case axial stop faces. In the opposite direction, a locking connection can be provided, making it possible to engage the screw piece on the sleeve piece, but simultaneously prevents dropping out in the other direction.

The hose connector with its body can simultaneously form the body of a hose coupling. However, it is also suitable for other parts, e.g. for hose connectors with two hose connections connected by a common body. The two-part construction also makes it possible to make the screw piece and sleeve piece from different materials, e.g. the sleeve piece from a somewhat more elastic material, which further improves the kink protection function. In each case, the extension ensures no negative action of hose bending in the vicinity of the hose connector, which would exert considerable one-sided forces on the fixing area of the hose.

These and further features can be gathered from the claims, description and drawings and the individual features, either singly or in the form of sub-combinations, can be implemented in an embodiment of the invention and in other fields and can represent advantageous, independently protectable constructions for which protection is hereby claimed. The subdivision of the application into individual sections and the intermediate titles in no way restrict the general nature of the statements made thereunder.

BRIEF DESCRIPTION OF THE DRAWING

An embodiment of the invention is described hereinafter relative to the single drawing constituting a longitudinal section through a hose connection.

DESCRIPTION OF THE EMBODIMENT

The drawing shows a hose connector 11 constructionally connected to a hose coupling 12. They have a common body 13 on which is shaped a socket 15, whose external diameter is adapted to the nominal internal diameter of the hose 14 to be connected.

The socket 15 is surrounded by, a bush 16, which has an external thread 17. Onto the bushes free end are shaped gripping elements 18, which comprise a cam part 19 with inner gripping teeth 20 and shaped in one piece by means of a web 21 with the bush 16. By means of indentations between the gripping elements 18 they are constructed as individual gripping segments and can be radially pivoted independently of one another.

Facing the gripping elements 18 is provided a step 22 of the socket 15. An annular space for receiving the hose end 39 is formed between the socket 15 and the bush 16.

A screw piece 25 of a sleeve 24 is screwed onto the thread 17 of the bush 16. The sleeve 24 is constructed in two-part manner from the screw piece 25 and a sleeve piece 32. They are interconnected by means of connecting means, which in the represented embodiment comprises an inner, all-round projection 29 of the screw piece 25 and a correspondingly shaped recess 34 in the sleeve piece 32. The screw pieces 25 can also include an internal thread 27 and an external gripping serration system 28. The sleeve piece 32 projects out of the screw piece 25, which acts in the manner of a cap nut, by an extension 35, whose length extending beyond the screw piece 25 exceeds the screw diameter. In the preferred embodiment, said length is almost twice the hose external diameter.

The bush 16 terminates, considered in the hose passage direction, shortly behind the action point of the gripping elements 18. At this point, the sleeve extension 35 begins and the distance from there to the mouth 36 of the substantially tubular extension is almost three hose diameters.

The extension 35 has an internal diameter, which is somewhat larger than the normal external diameter of the hose provided. However, this distance is very small and is usually below 1 mm or approximately ¹⁄₁₀ to ¹⁄₃₀ of the hose external diameter. It is intended to ensure that the hose can be shoved in in this area without any significant obstacles.

In the vicinity of the mouth 36, an inner bead 37 is provided on the extension 35, whose internal diameter corresponds to the hose 14 with the nominal internal diameter and normal wall thickness.

FUNCTION

The drawing shows the hose coupling in the connected state. Prior to the connection of the hose 14, the screw piece 25 is largely unscrewed from the thread 17, so that the actuating surface 33 of the sleeve piece 32 releases the gripping elements 18 and can deflect them outwards. The free end 39 of hose 14 is placed through the sleeve 24 for the connection of the a hose 14. Therefore, it is threaded in at the mouth 36 and is passed through in relatively friction-free manner over the remaining length of the extension 35. When the end 39 engages at the end of the annular space 23, the screw piece 25 is screwed with its internal thread 27 onto the external thread 17 of the bush. The sleeve piece 32 carried along to the left in the drawing, i.e. towards the body 13 by means of the projection 34, 29 and the support shoulder 30 formed thereon presses with its funnel-shaped, conical actuating surface 33 on the outside of the cam parts 19 of the gripping elements 18 and presses them inwards, accompanied by the elastic bending of the webs 21. They act in much the same way as a film hinge, but have a considerable axial force absorption capacity. During this movement, the screw piece 25 can rotate with respect to the sleeve piece 32, so that the latter, as a function of the frictional and force conditions, does not rotate therewith.

As can be gathered from the drawing, the gripping elements 18 with their teeth 20 press into the hose wall and press the latter in firm, sealing manner onto the outer wall of the socket 15 and into any step 22 provided there.

Thus, a tight, mechanically strong hose connector is obtained. When pressure is applied to the hose, in the vicinity of the extension 35, the latter can only expand by the small spacing 38 between the hose and the internal diameter and then engages on the outer wall, which supports it against inflation. In the vicinity of the extension, the hose is internally free, because the socket ends shortly behind the clamping area (gripping elements 18). This also facilitates the fitting of the hose onto the socket, whose slightly conical construction somewhat expands the hose.

In the vicinity of the mouth 36, the hose is again guided by the bead 37 and is sealed to such an extent that there is no need to fear dirt penetration into the intermediate space. If bending forces occur, they act in the vicinity of the mouth 36, which is sufficiently far removed from the clamping area to protect the same from axial tension due to the bending forces, so that kinking, bending and other forces are largely kept away from the connecting area.

We claim:

1. Hose connector for connecting hoses to hose couplings, the hose connector comprising:

a basic body having a circular socket extending along an axis, over which a hose end of a hose can be fitted, and a bush, the bush at least partially, radially surrounding the hose end and the socket;

gripping elements formed at a free end of the bush, the gripping elements being movable towards the socket for engaghement with a hose end;

an external thread proveded at an outer circumference of the basic body;

a two-part sleeve screwably connected to the thread, the two-part sleeve having a screw part, a sleeve part and connecting means between the sleeve part and the screw part, the connecting means allowing the sleeve part to remain rotationally stationary and to be driven along the axis by the screw part as the screw part is rotated and thereby screwably connected to the thread;

the sleeve part having a surrounded portion, the surrounded portion having an actuating surface urging the gripping elements towards the socket to press against a hose fitted on the socket;

the sleeve part further comprises an extension portion having a length projecting axially beyond a free end of the socket;

and wherein the length is at least equal to the outer diameter of the socket.

2. Hose connector according to claim 1, wherein the actuating surface is oblique.

3. Hose connector according to claim 1, wherein the sleeve part has a portion projecting beyond the free end of the socket, said sleeve portion being substantially cylindrical and is dimensioned to be radially spaced from a hose to be fitted on the socket.

4. Hose connector according to claim 3, wherein the sleeve part has a mouth and a bead on the mouth of the sleeve part, the bead substantially adapted to engage an external diameter of the hose.

5. Hose connector according to claim 1, wherein the gripping elements are constructed as hinge-like shaped gripping segments having inner teeth and an outer pressure surface for cooperating with the actuating surface of the sleeve.

6. Hose connector according to claim 1, wherein the bush is formed integrally with the basic body and providing the external thread.

7. Hose connector according to claim 1, wherein the socket has an outer surface defining a circular depression and a stepped taper disposed opposite to the gripping elements.

8. Hose connector according to claim 1, wherein the connecting mean s prevents the sleeve part from being drawn away from the screw part in a direction along the axis.

9. Hose connector according to claim 8 wherein the surrounded portion of the sleeve part is at least partly surrounded by the screw part.

10. Hose connector according to claim 9, wherein the length is between two and three times the outer diameter of the socket.

11. Hose connector according to claim 8, wherein the connecting means further comprises a snap locking connection restricting movement of the screw part relative to the sleeve part in either direction along the axis.

12. Hose connector for connecting hoses to hose couplings, the ho se connector comprising:

- a basic body having a circular socket extending along an axis, over which a hose end of a hose can be fitted, and a bush, the bush at least partially, radially surrounding the socket;
- gripping elements formed at a free end of the bush, the gripping elements being moveable towards the socket for engagement with a hose end;
- an external thread provided at an outer circumference of the basic body;
- a two-part sleeve screwably connected to the thread, the two-part sleeve having a screw part, a sleeve part and connecting means between the sleeve part and the screw part;

the connecting means allowing rotation of the screw part around the axis relative to the sleeve part, and the connecting means preventing movement of the screw part relative to the sleeve part in a direction along the axis towards a closed end of the socket as the screw part is rotated and thereby screwably connected to the thread;

said sleeve part having a surrounded portion and an extension portion, the surrounded portion being at least partly surrounded by the screw part, and an actuating surface of the surrounded portion urging the gripping elements towards the socket to press against a hose when fitted on the socket; and, a length of the extension portion projecting axially beyond a free end of the socket.

13. Hose connector according to claim 12, wherein the length is between two and three times the outer diameter of the socket.

* * * * *